March 22, 1966  O. ERDMANN  3,241,413
CUTTING DEVICE

Filed July 10, 1963  9 Sheets-Sheet 1

Fig.1

Inventor:
OTTO ERDMANN
by
Michael S. Striker
Atty.

Fig.3

March 22, 1966  O. ERDMANN  3,241,413
CUTTING DEVICE
Filed July 10, 1963  9 Sheets-Sheet 4

Fig.4

Inventor:
OTTO ERDMANN
by
Michael S. Striker

March 22, 1966

O. ERDMANN 3,241,413

CUTTING DEVICE

Filed July 10, 1963

Inventor:
OTTO ERDMANN
by
Michael S. Striker

March 22, 1966  O. ERDMANN  3,241,413
CUTTING DEVICE

Filed July 10, 1963  9 Sheets-Sheet 6

Fig.6

Inventor:
OTTO ERDMANN
by Michael S. Striker

Inventor:
OTTO ERDMANN
by
Michael S. Striker

United States Patent Office

3,241,413
Patented Mar. 22, 1966

3,241,413
CUTTING DEVICE
Otto Erdmann, Hamburg-Bergedorf, Germany, assignor to Hauni-Werke Körber & Co. K.G., Hamburg-Bergedorf, Germany
Filed July 10, 1963, Ser. No. 294,083
Claims priority, application Germany, July 14, 1962, H 46,378
14 Claims. (Cl. 83—305)

The present invention relates to cutting or slitting devices in general, and more particularly to a rotary cutoff mechanism which is especially suited for severing an axially moving rod into sections of requisite length. Such rods may assume the form of tobacco rods of the type used in the production of cigars, cigarillos, and cigarettes, filter rods, or combination rods consisting in part of tobacco and in part of filter material.

In conventional cutting devices of this general character, the length of sections to be severed is varied by changing the relationship between the axial speed of the rod and the rotational speed of the knife which orbits in a plane perpendicular to the direction of forward movement of the rod. Such adjustments are satisfactory if the length of sections must be varied to a comparatively small extent, for example, if an operator desires to convert the machine from the production of regular cigarettes to the production of king size cigarettes or vice versa. The extent of such adjustment in a cigarette rod forming machine is normally in the range of 4 cm. because the length of regular cigarettes is about 5 cm. and the length of king size cigarettes is 9 cm. or thereabouts. In order to effect such adjustments, the cutting device must be furnished with two or more transmissions which drive the knife at different speeds or, alternatively, a single transmission must be provided with two or more sets of gears.

Considerable difficulties arise when such conventional cutting devices are used for severing a continuously advancing rod into sections of unit length or multiple unit length, i.e., when it becomes necessary to multiply the length of individual sections. It is known that modern cigarette and filter cigarette machines often utilize cigarette sections and filter sections of multiple unit length, and such sections are thereupon severed in a later stage of the operation. Since a modern cigarette machine or filter cigarette machine operates at high speeds to produce up to 2,000 cigarettes per minute, even short interruptions in the operation of such machines with a view to exchange the gears of the cutting device will result in considerably reduced output.

Accordingly, it is an important object of this invention to provide an improved cutting device for severing an axially moving rod into sections of unit length or multiple unit length and to construct the cutting device in such a manner that the rotational speed of one or more orbiting knives or blades may remain unchanged when it becomes necessary to convert the cutting device for severing of shorter or longer sections from a continuously moving rod.

Another object of the invention is to provide a cutting device of the just outlined characteristics which may be used in connection with conventional rod forming machines.

A further object of the invention is to provide a cutting device for severing a rod into sections of unit length or multiple unit length which is constructed and assembled in such a way that the period of time necessary to form a cut is but a fraction of the time necessary for similar operation in conventional cutting devices which are known to me at this time.

An additional object of the invention is to provide a cutting device whose transmission need not be adjusted or exchanged when an operator desires to convert the device from severing of unit length sections to severing of multiple unit length sections or vice versa.

A concomitant object of the invention is to provide a rod forming machine which embodies a cutting device of the above outlined characteristics and wherein the axial speed of the continuously formed rod need not be varied when it becomes necessary to change the axial length of sections which are being severed from the rod.

Still another object of the invention is to provide a cutting device which may utilize one or more knives and which may be equipped with knives having one or more distinct cutting edges.

An additional object of the invention is to provide a cutting device whose knives will form clean cuts transversely of the rod irrespective of the axial speed of the rod and irrespective of whether the rod is to be severed into sections of unit length or multiple unit length.

With the above objects in view, one feature of the invention resides in the provision of a cutting device which may be converted from severing of unit length sections to severing of multiple unit length section by the simple expedient of changing the number of knives and/or the number of cutting edges on the knives which are carried by a revolving and axially reciprocable carrier in such a way that each knife orbits about the axis of the carrier and that each knife simultaneously revolves about an axis which is spaced from the axis of the carrier. Such movements of one or more knives may be brought about by a drive including a simple planetary gear transmission with a fixed sun wheel about which the carrier rotates and one or more planet pinions which are connected with the knives and which are mounted in the carrier so as to mate with the sun wheel and to thereby rotate the knives about their respective axes. The rotational speed of a knife about the axis of its planet pinion may exceed several times the rotational speed of the carrier, and the cutting device further comprises means for reciprocating the carrier so that the knives move with and at the speed of the axially advancing rod at the time their cutting edges engage and form a transverse cut in the rod.

In accordance with another important feature of the present invention, the ratio of the transmission which rotates the knives about their axes is such that each knife completes one or more full revolutions plus a fraction of a revolution in response to a full revolution of the carrier. In other words, and if the ratio of the transmission is $$\left(n+\frac{n}{2}\right):1$$

and if $n$ is a whole number (e.g., 3), a knife will complete four and a half revolutions when the carrier completes one revolution.

In one of its preferred forms, the cutting device of my invention comprises a carrier arranged to rotate about a first axis which is parallel with the direction of axial movement of the rod, a knife holder mounted on the carrier and arranged to rotate about a second axis which is spaced from and which is normally parallel with the first axis, knife means preferably with one or more distinct cutting edges fixed to and arranged to rotate with the holder, first drive means for rotating the carrier at a first speed, second drive means which preferably assumes the form of a planetary transmission driven by the first drive means and which is arranged to rotate the holder at a second speed so that the holder assumes a different angular position with respect to the carrier after each consecutive full revolution of the carrier, and reciprocating means connected with and arranged to reciprocate the carrier axially at the speed of the rod which is to be severed by the knife means and at such frequency that the knife means moves in the same direction as the rod at the time it severs a section therefrom.

The novel features which are considered as characteristic of the invention are set forth in particular in the appended claims. The improved cutting device itself, however, both as to its construction and its mode of operation, together with additional features and advantages thereof, will be best understood from the following detailed description of certain specific embodiments with reference to the accompanying drawings, in which:

Figure 1:
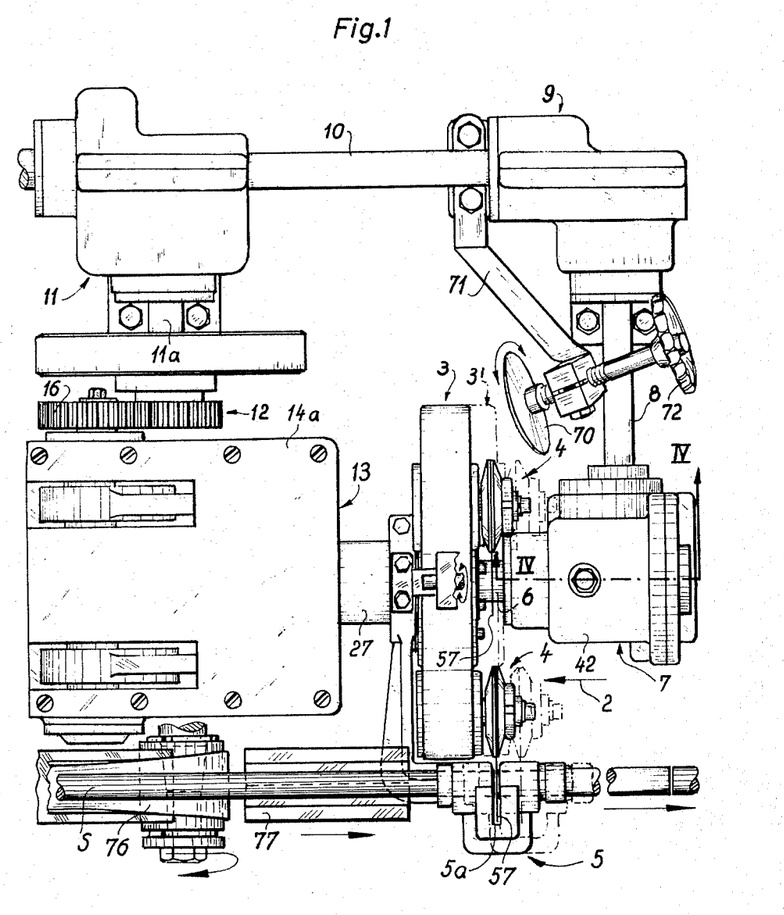
FIG. 1 is an elevational view of a portion of a rod forming machine and of a cutting device which embodies the present invention, the carrier of the cutting device being shown in two end positions one of which is indicated in phantom lines.

Referring to the drawings, FIG. 1 illustrates a portion of a rod forming machine and the improved cutting device which derives motion from the main drive shaft 10 of the rod forming machine. This shaft drives a first transmission 9 whose output shaft 8 is the input shaft of a second transmission 7. The output shaft 6 of this second transmission 7 drives a carrier 3 for a series of knife holders 4. Each of these holders may support a knife in the form of a sickle shaped blade 57. A third transmission 11, driven by the main drive shaft 10, includes an output shaft 11a which drives a reducing gear in the form of a gear train 12, the latter serving to operate a reciprocating mechanism 13 which imparts to the carrier 3 reciprocatory movements in the axial direction of a ledger tube 5 serving to guide a continuously advancing tobacco rod S.

Figure 2:
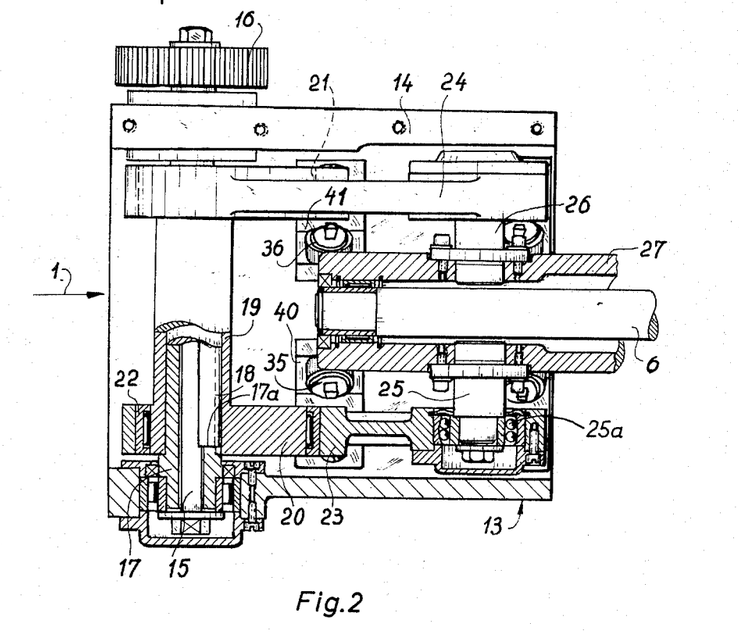
FIG. 2 is an enlarged top plan view of a mechanism which forms part of the structure shown in FIG. 1 and which serves to reciprocate the carrier of the cutting device at a predetermined frequency in and counter to the direction of axial movement of the rod, the cover of the mechanism being removed and certain parts of this mechanism being shown in section.

The mechanism 13 is shown in FIG. 2 with the cover plate 14a removed. Its housing 14 is mounted on a frame member F (see FIG. 3) and supports a shaft 15 which is driven by a gear 16 forming part of the gear train 12. The shaft 15 is mounted in an inner sleeve 17 which is provided with an axially extending slot 17a for a key 18, the latter serving as a coupling which connects the inner sleeve 17 with the shaft 15 and with an outer sleeve 19. The ends of the outer sleeve 19 are rigid with two eccentric disks 20, 21 each surrounded by a needle bearing 22 accommodated in the straps of rods 23, 24. The right-hand ends of the rods 23, 24 respectively carry pins 25, 26 which are secured to a hollow tubular extension 27 of a sun wheel 28, see FIG. 5. Suitable bearings 25a enable the rods 23, 24 to oscillate about the pins 25, 26.

Figure 3:
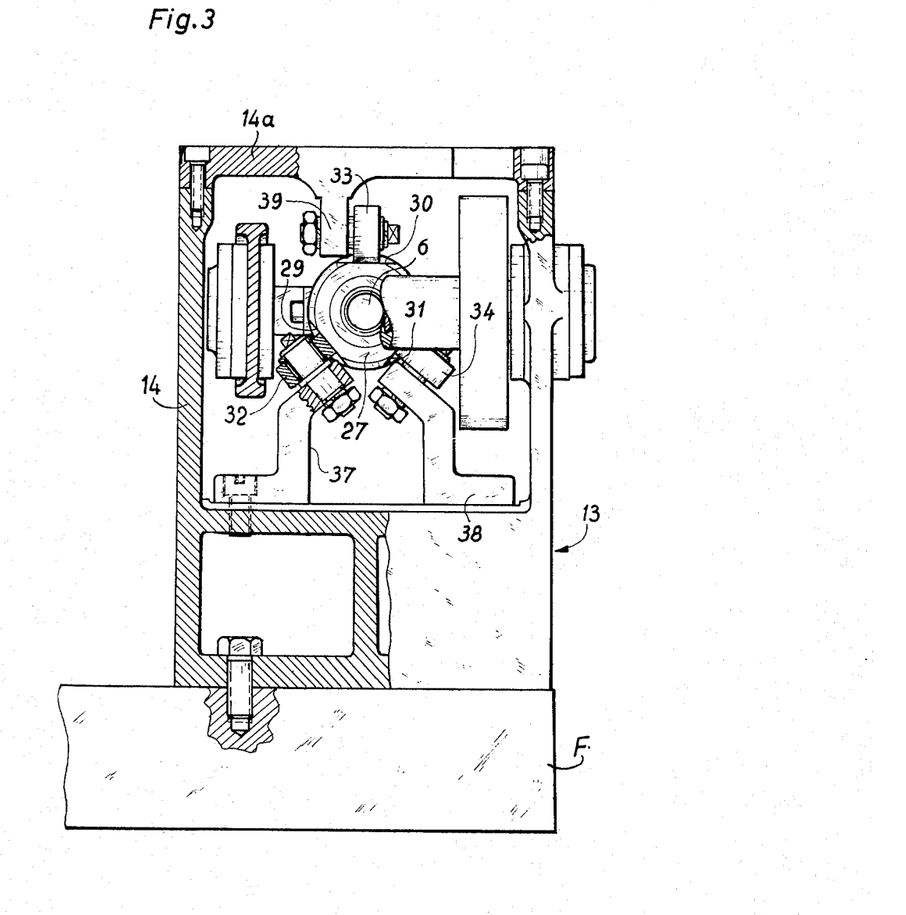
FIG. 3 is an end view of the reciprocating mechanism as seen in the direction of arrow 1 in FIG. 2, certain parts of the mechanism being broken away.

As shown in FIG. 3, the extension 27 is provided with three axially parallel flat external faces 29, 30, 31 which are respectively tracked by rollers 32, 33, 34. FIG. 2 shows additional rollers 35, 36 which track the faces 31, 29. The rollers 32, 34, 35, 36 are respectively mounted in bearing brackets 37, 38, 40, 41 which are secured to the housing 14. The purpose of the faces 29–31 and of the rollers 32–36 is to restrict the extension 27 to axial movements, i.e., to prevent rotation of this extension. The roller 33 is mounted in a bracket 39 which is rigid with the cover 14a and this cover also carries a second bracket for a second roller (not shown) which also tracks the face 30.

The extension 27 serves as a bearing sleeve or shell for the output shaft 6 of the transmission 7. FIG. 2 shows that the left-hand end of the shaft 6 is rotatably secured to the extension 27 so that the shaft 6 must share all axial movements of this extension in response to rotation of the disks 20, 21.

The purpose of the reciprocating mechanism 13 is to reciprocate the shaft 6 axially and at the same speed at which the rod S to be severed is caused to move endwise along a path which is parallel to the axis of the shaft 6. In addition, the mechanism 13 reciprocates the shaft 6 at such frequency that each knife 57 moves in the same direction as the rod at the time it engages and severs a section from the rod. It goes without saying that the cutting device of my invention is equally suited for forming incisions in a continuously moving rod without actually severing the rod into separate sections.

Figure 4:
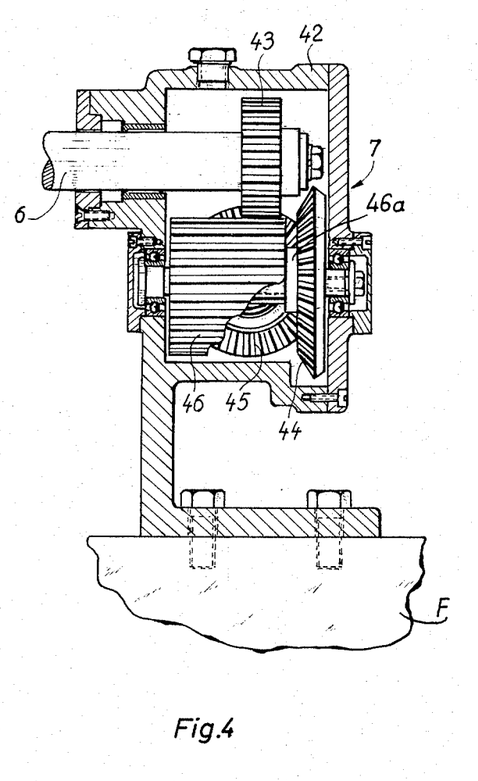
FIG. 4 is an enlarged section through a transmission which drives the carrier of the cutting device, the section of FIG. 4 being taken along the line IV—IV of FIG. 1 or FIG. 5, as seen in the direction of arrows.

As shown in FIG. 4, the other end of the shaft 6 is rotatably mounted in and extends into the housing 42 of the transmission 7 where it carries a spur gear 43 mating with a spur gear 46 of considerable axial length so that the gears 43, 46 remain in mesh when the shaft 6 is compelled to share axial movements of the extension 27. Of course, the same result may be achieved by reversing the position of these spur gears or by replacing the shaft 6 with a composite shaft having two telescoped sections one of which is movable axially in but cannot rotate with respect to the other section. The shaft 46a of the gear 46 carries a bevel gear 44 which mates with a second bevel gear 45 mounted on the output shaft 8. The housing 42 is mounted on the frame member F.

Figure 5:
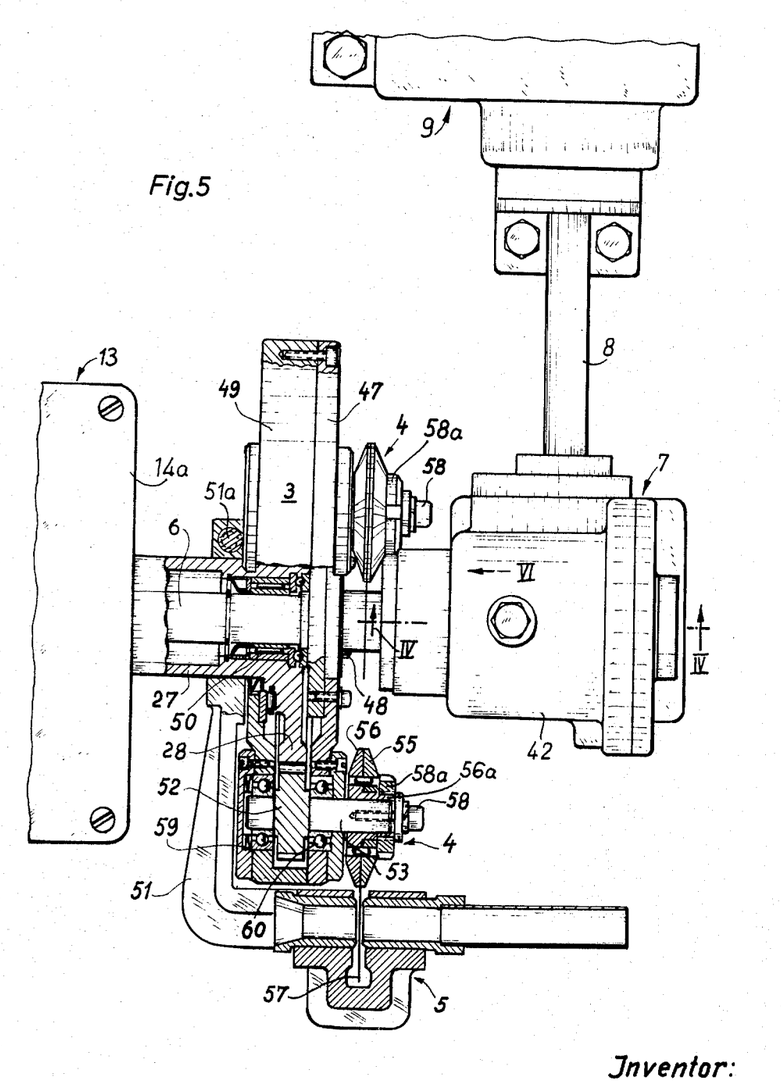
FIG. 5 is an enlarged fragmentary detail view of the structure shown in FIG. 1, the carrier of the cutting device being illustrated in partial section and the ledger tube for the axially advancing rod being illustrated in full section.

Referring to FIG. 5, the carrier 3 is mounted on the shaft 6 and is located in the space between the reciprocating mechanism 13 and the transmission 7. This carrier comprises an annular flange 47 which is secured to the shaft 6 by means of a key 48 and which constitutes the lid of a short cylindrical casing or drum 49. The internal space of the drum 49 accommodates a planetary transmission serving to rotate the knives 57. The bottom wall of the drum 49 is rotatable on the extension 27 of the sun wheel 28, the latter being held against rotation by the faces 29–31 which are engaged by rollers 32–36 in a manner as described in connection with FIGS. 2 and 3. The sun wheel 28 is provided with a central bore for the shaft 6 so that the shaft 6 may project into the extension 27 and all the way into the housing 14. There is a needle bearing 50 to support that portion of the shaft 6 which extends through the bore of the sun wheel 28.

The ledger tube 5 comprises an arm 51 which is adjustably fixed to the extension 27 by a suitable clamping device 51a so that the position of the tube 5 with respect to the drum 49 may be adjusted as desired both in the axial direction of as well as angularly about the extension 27.

The sun wheel 28 meshes with three planet pinions 52 (only one shown in FIG. 5) whose shafts 53 are rotatable in the flange 47 and in the bottom wall of the drum 49, and these shafts are rigidly secured to the respective knife holders 4. Each holder 4 comprises a pair of clamping disks 55, 56 which engage the opposite sides of the respective knife 57. Each disk 56 has an externally threaded hub 56a which meshes with a clamping nut 58a, and these nuts are held against rotation by suitable locking devices 58. Each shaft 53 is rotatable in two antifriction bearings 59, 60 which are respectively carried by the bottom wall of the drum 49 and by the flange 47. It will be noted that the axes of the shafts 53 are parallel to the axis of the shaft 6.

Figure 6:
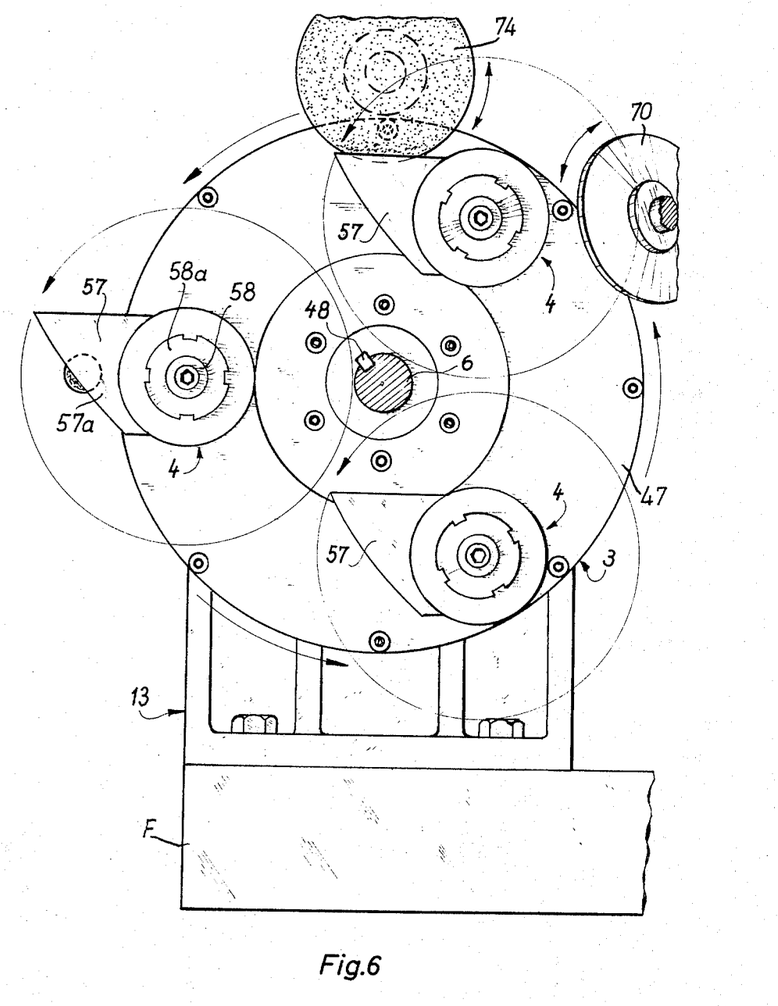
FIG. 6 is an enlarged end elevational view of the carrier as seen in the direction of arrow VI in FIG. 5.

FIG. 6 shows that the holders 4 are equidistant from each other and from the shaft 6 so that the angular distance between each pair of adjacent holders is 120 degrees. While the illustrated embodiment comprises one sickle shaped knife 57 with a single cutting edge 57a for each holder 4, it is equally possible to provide each knife with two distinct cutting edges (see FIGS. 8a–8g) or to provide two knives 57 for each holder so that the structure of FIG. 6 will have a total of six knives 57 or a total of three double-edge knives.

The transmission 7 and the shaft 6 constitute a drive means for rotating the carrier 3 about the axis of the shaft 6, and the transmission 7 constitutes a second drive means which rotates the holders 4 about the axes of the respective shafts 53 at a speed which preferably exceeds the speed of the carrier 3 and in such a way that each holder 4 assumes a different angular position with respect to the carrier 3 in response to each consecutive full revolution of the carrier about the axis of the shaft 6.

Figure 7A:
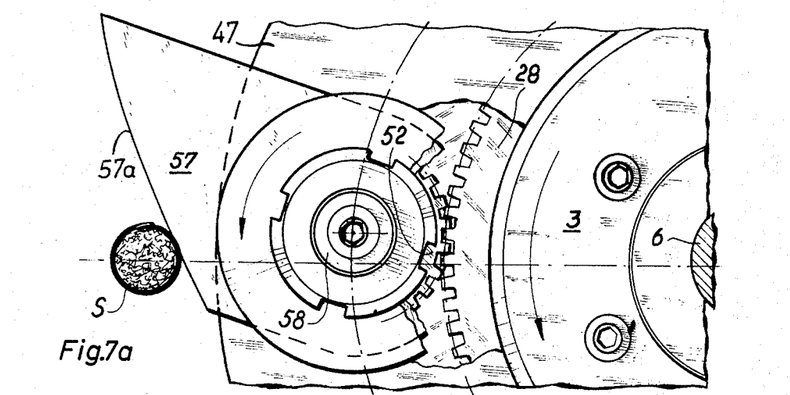
FIGS. 7a to 7c illustrate on a greatly enlarged scale three different angular positions of the carrier and of a knife which is provided with a single cutting edge.

The operation of the cutting device which is shown in FIGS. 1 to 6 will be described with reference to FIGS. 7a to 7c. As shown in FIG. 7a, the flange 47 rotates with the shaft 6 and the planet pinion 52 meshes with the sun wheel 28 so that, while revolving with the flange, the knife 57 also rotates with respect to this flange. Consequently, the rod S is severed within a very short period of time even if the shaft 6 does not rotate at high speed. Furthermore, the throw of the eccentrics 20, 21 can be very short since the cutting edge 57a will complete a cut within a very short period of time, i.e., within a fraction of the time which would be required to form a cut were the knives 57 rigid with the flange 47. Moreover, the cut is cleaner if it is completed while the cutting edge moves at high speed. In other words, by providing a cutting device wherein the knives rotate with as well as with respect to the shaft 6, the duration of contact between the cutting edges 57a and the rod S is reduced to a fraction of the time normally required for such step.

Figure 7B:
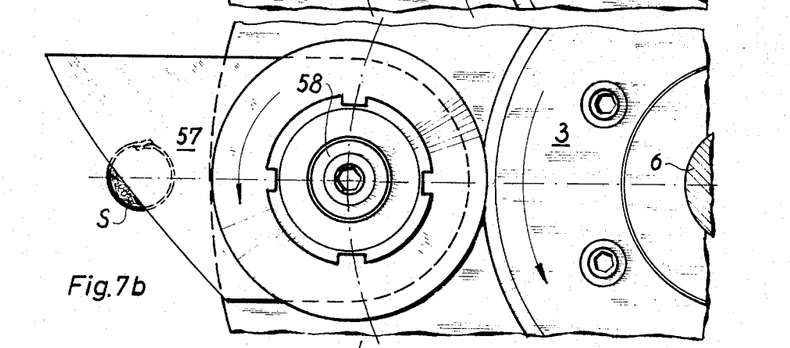
Figure 7C:
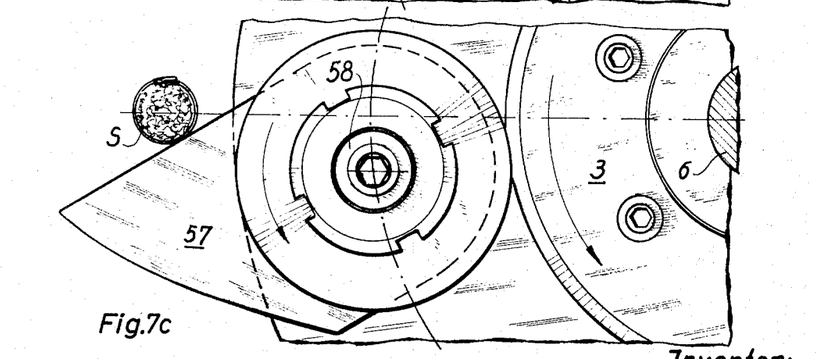

By comparing FIG. 7a with FIGS. 7b and 7c, it will be noted that the knife 57 rotates about the axis of the shaft 6 and about the axis of its shaft 53. In the illustrated embodiment, the rod S is a wrapped cigarette rod, but the cutting device is equally useful for severing rods used in the production of cigars, cigarillos, filters, filter cigarettes and other rod shaped articles which by themselves or together with similar rod shaped articles constitute tobacco containing products.

Figure 1A:
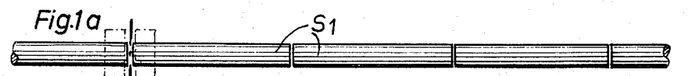
FIG. 1a illustrates a portion of a tobacco rod or filter rod which is being severed into sections of unit length.

FIGS. 8a to 8g show schematically the position of three double-edged knives I, II, III while the carrier 3 completes one third of a full revolution. The cutting device of FIGS. 8a to 8g is intended for severing a travelling rod S into sections S of unit length, see also FIG. 1a. The positions of the carrier 3 in consecutive FIGS. 8a–8g are angularly displaced through 20 degrees with reference to each other, and the carrier is assumed to be driven in a counterclockwise direction. The transmission ratio of the planet assembly is such that each shaft 53 completes four and half revolutions during a full revolution of the shaft 6 and each shaft 53 with its holder 4 rotates in a counterclockwise direction. In other words, while the carrier travels through an arc of 20 degrees, each holder completes one fourth of a full revolution. The speed of the rod S is selected in such a way that a unit length of this rod will advance within a period of time necessary to rotate the carrier through 120 degrees (from the position of FIG. 8a to the position of FIG. 8g), and the angular distance between the axes of the shafts 53 is also 120 degrees. Each holder 4 will complete one and a half revolutions in response to movement of the carrier 3 from the position of FIG. 8a to that of FIG. 8g.

Figure 8A:
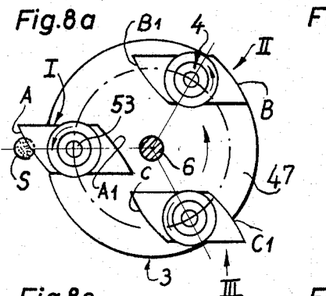
FIGS. 8a to 8g illustrate seven different angular positions of the carrier when the cutting device is used for severing sections of unit length from a continuously advancing tobacco or filter rod.
Figure 8B:
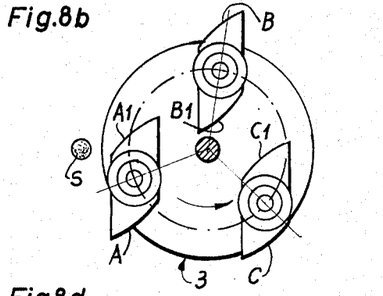
Figures 8C, 8D:
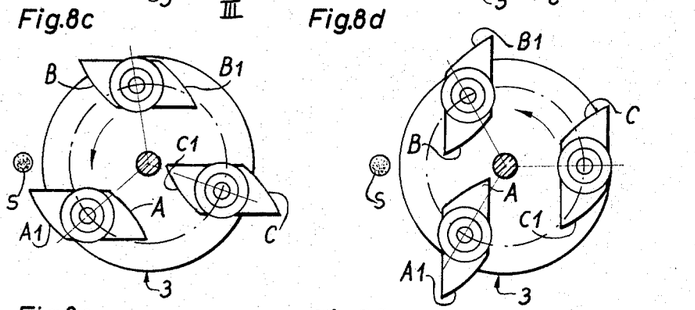

In FIG. 8a, the edge A of the knife I is about to sever the rod S. While the carrier 3 advances to the position of FIG. 8b, the cutting edge A is compelled to rotate through 90 degrees about the axis of the respective shaft 53, and such rotation with respect to the carrier 3 is shared by the knives II and III. In FIGS. 8c and 8d, the cutting edge A has respectively completed one half and three fourths of a full revolution, and such rotation is shared by the other cutting edge A, $A_1$ of the knife I as well as by the cutting edge B, $B_1$ and C, $C_1$ of the knives II and III. When the carrier 3 assumes the position FIG. of 8g, the cutting edge B of the knife II is about to sever the next section of unit length from the rod S, and the cutting edge C of the knife III will assume such position when the carrier 3 is rotated through 120 degrees beyond the position of FIG. 8a.

During the next revolution of the carrier 3, the rod S will be severed by the cutting edges $A_1$, $B_1$, $C_1$ in the same order. This will be readily understood since each knife completes four and a half revolutions in response to one full revolution of the carrier 3.

Figures 8E, 8F, 8G:
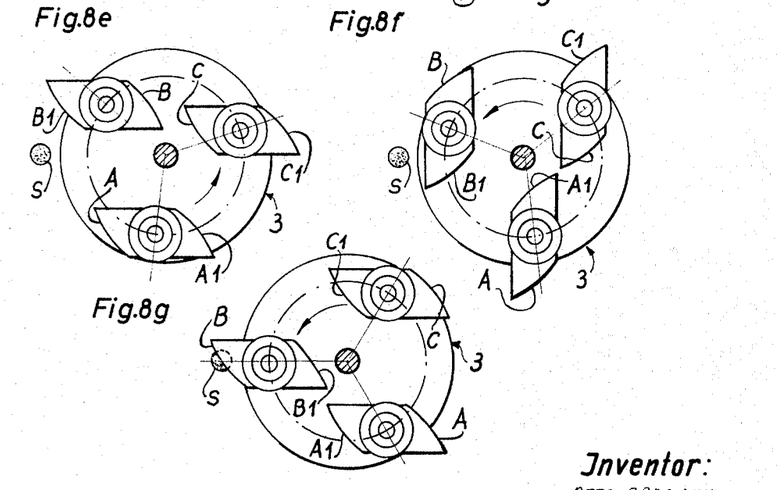

In FIG. 8g, the cutting edge C occupies the same position as the cutting edge B in FIG. 8a, and the cutting edge $A_1$ occupies in FIG. 8g the same position as the cutting edge C in FIG. 8a.

It will be noted that the angular position of each knife will change in response to each full revolution of the carrier 3 because, when the carrier completes a full revolution, the knife I will rotate through 4.5 x 360 degrees so that the cutting edge $A_1$ will take the position of the cutting edge A, reference being had to FIG. 8a. In other words, each knife completes at least one full revolution plus a fraction (normally 180 degrees) of a revolution in response to a full revolution of the carrier.

Figure 1B:
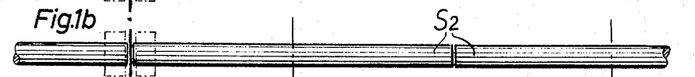
FIG. 1b illustrates a portion of a rod which is being severed into sections of double unit length.
Figure 9A:
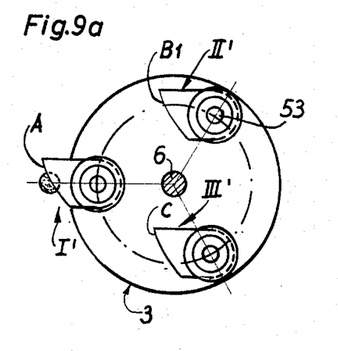
FIGS. 9a to 9c illustrate three different positions of the carrier when the cutting device is used for severing sections of double unit length from a continuously advancing rod.
Figure 9B:
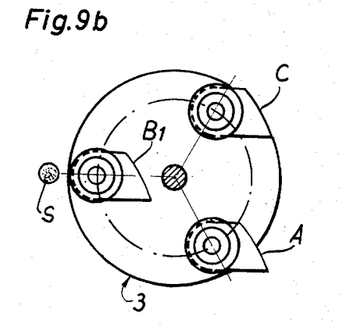
Figure 9C:
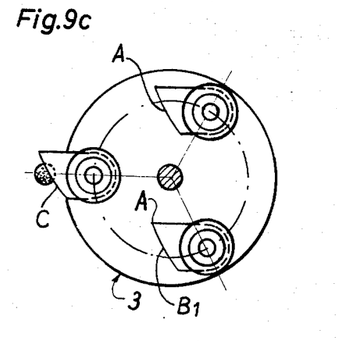

FIGS. 9a to 9c illustrate the manner of cutting the rod S into sections $S_2$ of double unit length, see also FIG. 1b. The knives I′, II′, III′ respectively comprises cutting edges A, $B_1$ and C, and the shaft 6 is driven at the same speed as in severing of unit length sections. When the carrier 3 travels through an angle of 120 degrees the cutting edge $B_1$ will complete one and a half revolutions about the axis of its shaft 53 so that it then assumes the position of FIG. 9b and bypasses the rod S. While the carrier 3 travels through another angle of 120 degrees to assume the position of FIG. 9c, the cutting edge C completes one and a half revolutions with respect to the position of FIG. 9b and severs the next section of double unit length from rod S.

When the carrier then travels through another angle of 120 degrees, the cutting edge A will assume the position of the cutting edge $B_1$ in FIG. 9b, and when the carrier rotates through another 120 degrees, the cutting edge $B_1$ will assume the position of the cutting edge A in FIG. 9a. Of course, the axial speed of the rod S must be the same as in FIGS. 8a to 8g because the r.p.m. of the shaft 6 remained unchanged. Thus, by the simple expedient of replacing the double-edged knives I, II, III with the single-edged knives I′, II′, III′ an operator may convert the improved cutting device to sever double unit length sections from the rod S. For example, such sections of double unit length may consist of filter material and are used for insertion between spaced cigarette sticks prior to wrapping a sheet of paper around the filter sections and around the adjacent end portions of cigarette sticks to form double unit length filter cigarettes.

By comparing the operation of the device shown in FIGS. 8a to 8g with that of the device which is shown in FIGS. 9a to 9c, it will be noted that the sequence in which the knives I, II, III sever unit lengths of rod material is A, B, C, $A_1$, $B_1$, $C_1$, A, B, etc. In severing of double unit length sections, the sequence is A, C, $B_1$, A, C, $B_1$, etc. provided, of course, the r.p.m. of the shaft 6 and the axial speed of the rod S remain unchanged.

Figure 1C:
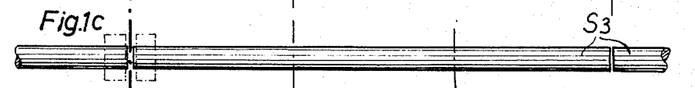
FIG. 1c illustrates a portion of a rod which is being severed into sections of triple unit length.
Figure 10A:
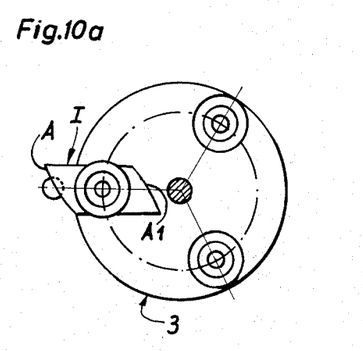
FIGS. 10a to 10c illustrate three different positions of the carrier when the cutting device is used to sever sections of triple unit length.
Figure 10B:
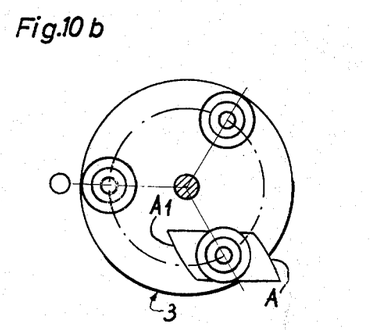
Figure 10C:
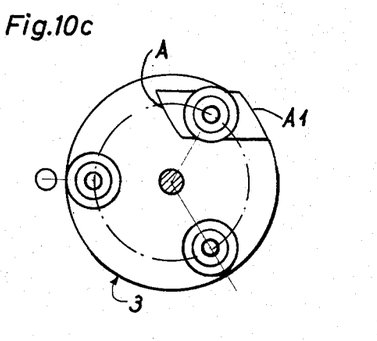

FIGS. 10a to 10c illustrate the operation of the carrier 3 when the cutting device is intended to sever from the rod S sections $S_3$ of triple unit length, see also FIG. 1c. In this embodiment, the carrier 3 is provided with a single double-edge knife I having cutting edges A and $A_1$. The r.p.m. of the carrier and the axial speed of the rod S are the same as in FIGS. 8a–8g and 9a–9c. In FIG. 10a, the cutting edge A is about to sever a section $S_3$ (see FIG. 1c) of triple unit length. When the carrier 3 then rotates through an angle of 120 degrees to assume the position of FIG. 10c, the knife I is spaced from the rod S, and this knife is again spaced from the rod when the carrier rotates through another angle of 120 degrees to assume the position of FIG. 10c. However, when the carrier completes a full revolution, the cutting edge $A_1$ moves to the position of the cutting edge A in FIG. 10a and severs the next section $S_3$ from the rod S. This will be readily understood since this knife I will complete four and half revolutions in response to one full revolution of the carrier.

In other words, and if the sequence of severing in FIGS. 8a–8g is

A, B, C, $A_1$, $B_1$, $C_1$ the cutting device of FIGS. 9a–9c will sever in the sequence

A, (B), C, ($A_1$), $B_1$, ($C_1$)

wherein the cutting edges B, $A_1$, $C_1$ are omitted, and the device of FIGS. 10a–10c will sever in the sequence

A, (B), (C), $A_1$, ($B_1$), ($C_1$)

wherein the cutting edges B, C, $B_1$ and $C_1$ are omitted.

If the operator desires to sever sections of sixtuple unit length, the knife I of FIGS. 10a–10c is replaced by one of the knives I', II', III'. The sequence of severing is then as follows:

A, (B), (C), ($A_1$), ($B_1$), ($C_1$)

wherein the cutting edges B, C, $A_1$, $B_1$ and $C_1$ are omitted.

The reciprocating mechanism 13 operates in such a way that the shaft 6 and the carrier 3 move in the same direction as and at the speed of the rod S when the cutting edges A, B, C, $A_1$, $B_1$, $C_1$, engage and sever the rod, and that the shaft 6 and carrier 3 are withdrawn to the full-line starting positions of FIG. 1 when the cuting edges are out of engagement with the rod. In FIG. 1, the foremost position of the carrier 3 is shown in phantom lines at 3'. It will be noted that the axial stroke of the carrier is exceptionally short because the severing step requires very little time so that the cutting device of this invention may be used in modern tobacco rod and filter rod forming machines which operate at high speed.

FIGS. 1 and 6 show a rotary disk shaped sharpening or grinding element 70 which is supported by a bracket 71 secured to the machine frame and whose position may be adjusted by and hand wheel 72 or in a fully automatic way so as to sharpen one side of each knife when the carrier 3 reaches the phantom-line position 3'. A second sharpening element 74 (shown in FIG. 6) is located at the other sides of the knives to engage these knives when the carrier 3 assumes the full-line position of FIG. 1.

The means for driving the sharpening element 70 and/or 74 is not shown in the drawings.

The rod S is delivered by a customary belt conveyor 76 which is located ahead of the ledger tube 5, and this tube has a slot 5a through which the knife or knives must pass when they perform a cutting or severing step. Since the ledger tube 5 is secured to the extension 27, it shares all reciprocatory movements of the carrier 3. While traveling from the discharge end of the belt 76 into the tube 5, the rod S is supported by a channel shaped bridge member 77.

The transmissions 9 and 11 are of conventional type and their construction forms no part of this invention.

It goes without saying that the cutting device of my invention may be modified by providing each knife or some of the knives with three or more cutting edges. It is also possible to use the cutting device for severing sections of varying length so that a shorter section is followed by a longer section or that two or more shorter sections are followed by one or more longer sections. All that is necessary is to change the spacing between the adjacent knife holders and/or to utilize simultaneously two or more knives with different numbers of cutting edges. All such modifications are so obvious that they will be readily comprehended without additional illustrations. For example, if the knife I' of FIGS. 9a–9c is replaced by the knife I of FIGS. 8a–8g, one can obtain sections of double unit length and sections of unit length, and sections of double unit length will alternate with pairs of sections of unit length.

Furthermore, the number of holders 4 may be changed to one, two, four or more without departing from the spirit of my invention. As a rule, and when the cutting device is used for severing sections of unit length or multiple unit length, the construction is normally such that a given cutting edge changes its angular portion by 180 degrees in response to each consecutive revolution of the carrier. The transmission ratio of the planetary gearing is then $$\left(n+\frac{n}{2}\right):1$$

wherein $n$ is a predetermined number. In the embodiment of FIGS. 8a–8g, the number $n=3$.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A cutting device for severing sections of predetermined length from an axially moving rod, comprising a carrier arranged to rotate about a first axis which is parallel to the direction of axial movement of the rod to be severed; a plurality of knife holders mounted on said carrier and arranged rotatably about separate second axes, respectively, which second axes are spaced from each other and located equidistant from and parallel to said first axis; knife means fixed to and arranged to rotate with at least one of said holders; drive means for rotating said carrier at a first speed; and transmission means operatively connected with said drive means for rotating said holders at a second speed in response to rotation of said carrier, the ratio of said transmission means being such that each holder completes at least one full revolution plus a fraction of a revolution about the respective second axis in response to each full revolution of said carrier about said first axis.

2. A cutting device for severing sections of predetermined length from an axially moving rod, comprising a carrier arranged to rotate about a first axis which is parallel to the direction of axial movement of the rod to be severed; more than two equidistant knife holders mounted on said carrier and arranged rotatably about separate second axes, respectively, which second axes are spaced from each other and located equidistant from and parallel to said first axis; knife means fixed to and arranged to rotate with at least one of said holders; drive means for rotating said carrier at a first speed; and transmission means operatively connected with said drive means for rotating said holders at a second speed in response to rotation of said carrier, the ratio of said transmission means being such that the rotational speed of each holder about the respective second axis exceeds the rotational speed of the carrier about said first axis.

3. A cutting device for severing sections of predetermined length from an axially moving rod, comprising a carrier arranged to rotate about a first axis which is parallel to the direction of axial movement of the rod to be severed; a plurality of knife holders mounted on said carrier and arranged rotatably about separate second axes, respectively, which second axes are spaced from each other and located equidistant from and parallel to said first axis; knife means fixed to and arranged to rotate with at least one of said holders; drive means for rotating said carrier at a first speed; and transmission means operatively connected with said drive means for rotating said holders at a second speed in response to rotation of said carrier, the ratio of said transmission means being such that each holder assumes a different angular position with respect to the carrier in response to each consecutive full revolution of the carrier about said first axis.

4. A cutting device for severing sections of predetermined length from an axially moving rod, comprising a carrier arranged to rotate about a first axis; a plurality of holders mounted on said carrier and arranged rotatably about separate second axes, respectively, which second axes are spaced from each other and located equidistant from and parallel to said first axis; knife means detachably fixed to at least one of said holders; first drive means for rotating said carrier about said first axis; and second drive means for rotating said holders about the respective second axes at such speed that each holder and the respective knife assumes a different angular position with respect to said carrier after each consecutive full revolution of the carrier.

5. A cutting device for severing sections of predetermined length from an axially moving rod, comprising a carrier arranged to rotate about a first axis which is parallel with the direction of axial movement of the rod to be severed; a plurality of holders mounted on said carrier and arranged rotatably about separate second axes, respectively, which second axes are spaced from each other and located equidistant from and parallel to said first axis; knife means fixed to at least one of said holders; first drive means for rotating said carrier about said first axis; second drive means for rotating said holders about the respective second axes at such speed that each holder and the respective knife means assumes a different angular position with respect to said carrier after each consecutive full revolution of the carrier; and reciprocating means connected with and arranged to reciprocate the carrier axially at the speed of axial movement of the rod which is to be severed so that each holder moves at the speed of the rod while the respective knife means severs a section therefrom.

6. A cutting device for severing sections of predetermined length from an axially moving rod, comprising a carrier arranged to rotate about a first axis which is parallel to the direction of axial movement of the rod to be severed; a plurality of knife holders mounted on said carrier and arranged rotatably about separate second axes, respectively, which second axes are spaced from each other and located equidistant from and parallel to said first axis; a knife fixed to at least one of said holders for rotation therewith, said knife having a cutting edge; drive means for rotating said carrier about said first axis; transmission means operatively connected with said drive means for rotating said holders about the respective second axes in response to rotation of said carrier, the ratio of said transmission means being such that the knife assumes a different angular position with respect to said carrier in response to each consecutive full revolution of the carrier about said first axis whereby the cutting edge severs the rod during a first revolution of the carrier but bypasses the rod during at least one revolution following such first revolution; and reciprocating means connected with and arranged to reciprocate the carrier axially at the speed of the rod to be severed and at such frequency that the cutting edge engages and severs the rod while the carrier moves axially in the same direction as the rod.

7. A cutting device for severing sections of predetermined length from an axially moving rod, comprising a carrier arranged to rotate about a first axis which is parallel to the direction of axial movement of the rod to be severed; a plurality of knife holders mounted on said carrier and arranged rotatably about separate second axes, respectively, which second axes are spaced from each other and located equidistant from and parallel to said first axis; a knife fixed to at least one of said holders for rotation therewith and having two cutting edges disposed at the opposite sides of the respective second axes; drive means for rotating said carrier about said first axis; transmission means operatively connected with said drive means for rotating said holders about the respective second axes in response to rotation of said carrier, the ratio of said transmission means being such that the knife completes at least one full revolution plus one half revolution about the respective second axis in response to each consecutive full revolution of the carrier about said first axis whereby the cutting adges alternatively sever the rod during consecutive revolutions of said carrier; and reciprocating means connected with and arranged to reciprocate the carrier axially at the speed of the rod to be severed and at such frequency that each cutting edge engages and severs the rod while the carrier moves axially in the same direction as the rod.

8. A cutting device for severing sections of predetermined length from an axially moving rod, comprising a carrier arranged to rotate about a first axis which is parallel to the direction of axial movement of the rod to be severed; a plurality of equidistant knife holders mounted on said carrier equidistant from and parallel with said first axis; a knife fixed to and rotatable with each of said holders, each knife having a cutting edge; drive means for rotating said carrier about said first axis; transmission means operatively connected with said drive means for rotating said holders in response to rotation of said carrier, the ratio of said transmission means being such that each knife assumes a different angular position with respect to said carrier in response to each consecutive full revolution of the carrier whereby any one of said cutting edges will sever the rod during a first revolution of said carrier but will bypass the rod during at least one revolution following such first revolution; and reciprocating means connected with and arranged to reciprocate the carrier axially at the speed of the rod to be severed and at such frequency that each cutting edge engages and severs the rod while the carrier moves axially in the same direction as the rod.

9. A cutting device for severing sections of predetermined length from an axially moving rod, comprising a carrier arranged to rotate about a fixed axis which is parallel with the direction of axial movement of the rod to be severed; a plurality of equidistant knife holders mounted on said carrier and arranged to rotate about second axes, respectively, said second axes being parallel to each other and parallel to and equidistant from said first axis; a knife mounted on and arranged to rotate with each of said holders, each of said knives having a plurality of angularly spaced cutting edges; drive means for rotating said carried about said first axis at a predetermined speed; transmission means operatively connected with said drive means and arranged to rotate said holders about the respective second axes in response to rotation of said carrier, the ratio of said transmission means being such that each knife assumes a different angular position in response to consecutive full revolutions of said carrier so that consecutive cutting edges of each knife engage the rod to be severed during consecutive revolutions of the carrier; and reciprocating means connected with and arranged to reciprocate said carrier axially and at the speed of the rod to be severed and at such frequency that the cutting edges engage and sever the rod while the carrier moves axially in the same direction as the rod.

10. A cutting device as set forth in claim 9, wherein each of said knives comprises two cutting edges which are angularly spaced through 180 degrees with reference to the respective second axes, the ratio of said transmission means being $$n+\frac{n}{2}:1$$

wherein $n$ is a whole number so that each knife completes at least one full revolution plus a half revolution in response to each full revolution of said carrier.

11. A cutting device for severing sections of predetermined length from an axially moving rod, comprising a carrier arranged to rotate about a first axis which is parallel to the direction of axial movement of the rod to be severed; a plurality of holders mounted on said carrier and arranged rotatably about separate second axes, respectively, which second axes are spaced from each other and equidistant from and parallel to said first axis; knife means detachably fixed to at least one of said holders; first drive means for rotating said carrier about said first axis; and second drive means for rotating each holder about the respective second axis at such speed that each holder assumes a different angular position with respect to said carrier after each consecutive full revolution of the carrier, the ratio of rotational speed of the holders about the respective second axes to the rotational speed of the carrier about said first axis being $$n+\frac{n}{2}:1$$

wherein $n$ is a whole number so that each holder completes at least one full revolution plus a half revolution while the carrier completes a full revolution.

12. A cutting device for severing sections of predetermined length from an axially moving rod, comprising a carrier arranged to rotate about a first axis; a plurality of holders mounted on said carrier and arranged rotatably about separate second axes, respectively, which second axes are spaced from each other and equidistant from and parallel to said first axis; knife means fixed to at least one of said holders; first drive means for rotating said carrier about said first axis, said first drive means comprising a shaft coaxially secured to said carrier; and second drive means for rotating each holder about the respective second axis at such speed that each holder assumes a different angular position with respect to said carrier after each consecutive full revolution of the carrier, said second drive means comprising a sun wheel coaxial with said shaft, a planet pinion meshing with said sun wheel and drivingly connected with said holders, and means drivingly connecting said shaft with said planet pinion so that the pinion orbits about said sun wheel in response to rotation of said shaft.

13. A cutting device as set forth in claim 12, wherein said first drive means further comprises a first spur gear coaxially fixed to said shaft, a second spur gear meshing with said first spur gear, one of said spur gears being of such axial length that the shaft is free to reciprocate while said spur gears remain in mesh with each other, and means for rotating said second spur gear.

14. A cutting device for severing sections of predetermined length from an axially moving rod, comprising a carrier arranged to rotate about a first axis; a holder mounted on said carrier and arranged to rotate about a second axis which is spaced from said first axis; knife means fixed to said holder; first drive means for rotating said carrier about said first axis, said first drive means comprising a shaft coaxially secured to said carrier, a first spur gear coaxially fixed to said shaft, a second spur gear meshing with said first spur gear, one of said spur gears being of such axial length that the shaft is free to reciprocate while said spur gears remain in mesh with each other, and means for rotating said second spur gear; second drive means for rotating said holder about said second axis at such speed that the holder assumes a different angular position with respect to said carrier after each consecutive full revolution of the carrier, said second drive means comprising a sun wheel coaxial with said shaft, a plant pinion meshing with said sun wheel and drivingly connected with said holder, and means drivingly connecting said shaft with said planet pinion so that the pinion orbits about said sun wheel in response to rotation of said shaft; and reciprocating means for reciprocating said shaft with said carrier and said sun wheel with respect to said second spur gear and in the axial direction of the rod to be severed, said reciprocating means comprising a tubular extension rigid with said sun wheel and rotatably receiving a portion of said shaft, means connecting said shaft to said extension, eccentric means, means for driving said eccentric means, strap means mounted on said eccentric means and coupled to said extension, and means for holding said extension against rotation.

References Cited by the Examiner

UNITED STATES PATENTS

| | | | |
|---|---|---|---|
| 687,162 | 11/1901 | Mahony | 83—337 X |
| 1,205,913 | 11/1916 | Maltby et al. | 83—318 X |
| 1,297,203 | 3/1919 | McGunigal | 83—318 |
| 1,591,069 | 7/1926 | Witte | 83—337 X |
| 2,033,789 | 3/1936 | Rose | 83—318 |
| 2,214,430 | 9/1940 | Molins | 131—25 |
| 2,350,975 | 6/1944 | Rodder et al. | 83—318 X |
| 2,464,108 | 3/1949 | Weisner et al. | 146—101 |
| 2,886,083 | 5/1959 | Horgan | 146—101 |
| 2,906,178 | 9/1959 | Cotts | 90—4 |
| 3,105,412 | 10/1963 | Tookey | 90—4 |

WILLIAM W. DYER, JR., *Primary Examiner.*

WILLIAM S. LAWSON, *Examiner.*